US006370222B1

(12) United States Patent
Cornick, Jr.

(10) Patent No.: US 6,370,222 B1
(45) Date of Patent: Apr. 9, 2002

(54) CONTAINER CONTENTS VERIFICATION

(75) Inventor: Louis C. Cornick, Jr., Annandale, VA (US)

(73) Assignee: CCVS, LLC, Annandale, VA (US)

( * ) Notice: Subject to any disclaimer, the term of this patent is extended or adjusted under 35 U.S.C. 154(b) by 0 days.

(21) Appl. No.: 09/494,551

(22) Filed: Jan. 31, 2000

Related U.S. Application Data

(60) Provisional application No. 60/120,435, filed on Feb. 17, 1999.

(51) Int. Cl.[7] ............................................... G01N 23/04
(52) U.S. Cl. ........................................... 378/57; 378/58
(58) Field of Search ..................... 378/57, 58, 62, 378/198, 189; 704/7; 707/1

(56) References Cited

U.S. PATENT DOCUMENTS

| | | | |
|---|---|---|---|
| 4,430,568 A | 2/1984 | Yoshida ................... 250/358.1 |
| 5,065,418 A | 11/1991 | Bermbach ..................... 378/57 |
| 5,153,842 A | * 10/1992 | Dlugos, Sr. et al. ........ 364/478 |
| 5,638,420 A | 6/1997 | Armistead .................... 378/57 |
| 5,692,028 A | 11/1997 | Geus ............................ 378/57 |
| 5,764,683 A | 6/1998 | Swift ........................... 378/57 |
| 5,838,759 A | * 11/1998 | Armistead .................... 378/57 |
| 5,991,399 A | * 11/1999 | Graunke et al. ................ 380/4 |
| 6,026,177 A | * 2/2000 | Mong et al. ................ 382/156 |
| 6,085,253 A | * 7/2000 | Blackwell ................... 709/235 |
| 6,085,976 A | * 7/2000 | Sehr ........................... 235/384 |

* cited by examiner

*Primary Examiner*—Robert H. Kim
*Assistant Examiner*—Irakli Kiknadze
(74) *Attorney, Agent, or Firm*—Pillsbury Winthrop LLP; Intellectual Property

(57) ABSTRACT

A method and system for verifying the contents of a cargo container includes acquiring at least one image of the cargo container and of the contents of the cargo container, the image being one of a backscatter X-ray image of the cargo container, and a transmission X-ray image of the cargo container. The image is stored with a manifest associated with the cargo container. The manifest is sent to another location, and, at the other location, selectively, a second image of the contents of the cargo container is acquired; and compared with the image stored with the manifest associated with the cargo container.

48 Claims, 5 Drawing Sheets

Fig. 2B

| Manifest Table Entry | | | | | | | | | | | |
|---|---|---|---|---|---|---|---|---|---|---|---|
| Manifest Identifier | | Manifest Date | | Operator Identifier | | Container Identifier | | | Weight Deviation | Other information | |
| Shipper Table Entry | Consignee Table Entry | Vessel Table Entry | Contents Table Entry | Container Table Entry | Image Table Entry | Int'l Ports Table Entry | Customs Table Entry | Port Control Table | | Validation Table Entry | Agent Table Entry |

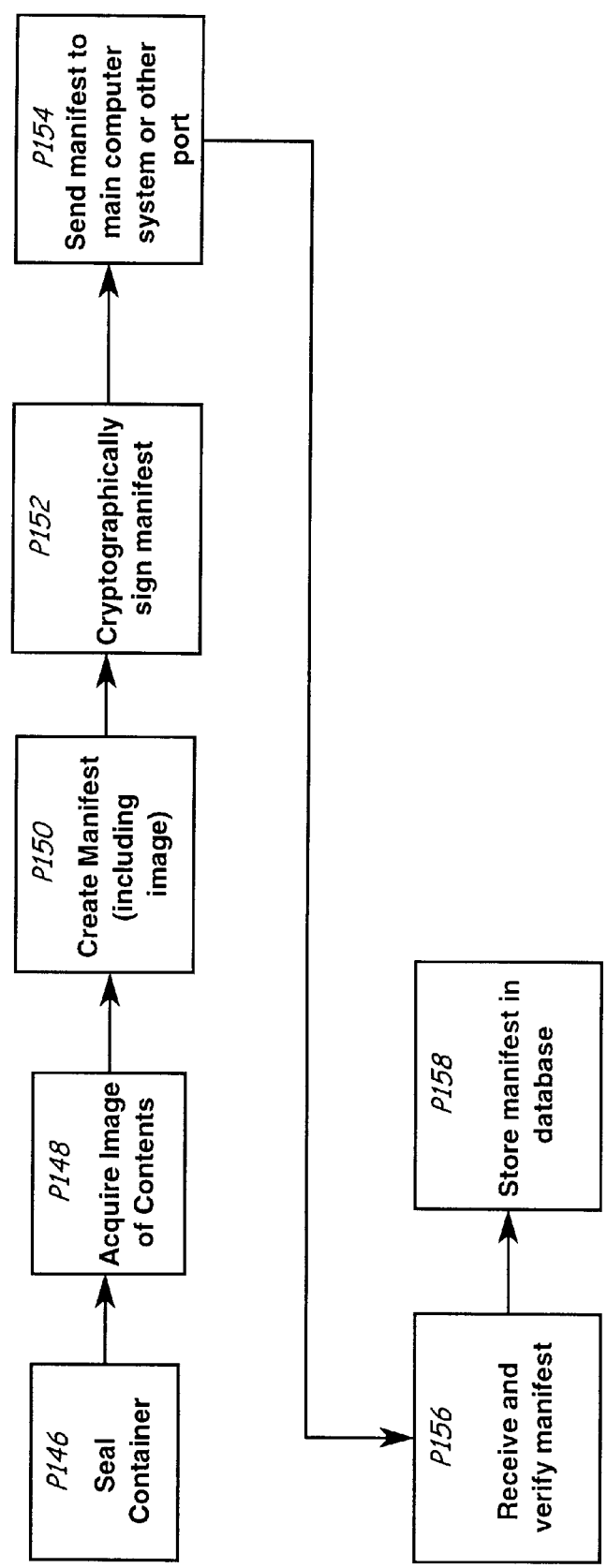

CONTAINER CONTENTS VERIFICATION

This application claims benefit to provisional application 60/120,435 Feb. 17, 1999.

BACKGROUND OF THE INVENTION

1. Field of the Invention

This invention relates to container contents verification. More particularly, this invention relates to methods, systems and devices for verification of the contents of containers, preferably large shipping containers.

2. Background

Assuring a safe and efficient flow of cargo and people through the ports and container facilities of the world is critical to a vibrant global economy. The economy and well-being of all nations requires a safe and effective transportation and shipping system. The global economy necessitates that the ports of a nation be capable of handling import and export trade in a manner that assures a nation's citizens and the foreign trading and business community that the risk experienced will be at acceptable and predictable levels.

Marine transportation is an integral component of almost every nation's transportation system. Marine transportation's efficient operation is critical to a nation's ability to engage in global trade. For example, in the United States, no matter how modem and efficient the highway, rail and air systems are, alone they cannot serve the needs of the global economy. Further, international trade is expected to triple by the year 2020, making the need for efficient operation of marine transportation even more critical.

In the United States there are about 355 ports that handle cargo at some 4,000 marine terminals. Of these ports, 150 account for about 99 percent of cargo tonnage. The United States is the destination of about 18 percent of all world import tonnage, and about 30 percent of all world merchant vessels call at U.S. ports annually. Ports and marine terminals are the interchange points between the various modes of transportation (e.g., ship, train, truck, etc.). Any bottlenecks at ports will therefore adversely affect the flow of cargo to its ultimate destination.

How well cargo moves through a port determines the success of that port, and, ultimately, of the trading nation. However, quick movement of cargo through a port must be balanced with the need for safety and security. Cargo security and sanctity have always been problems. Assuring cargo security becomes more difficult as the quantity of cargo increases. This difficulty is exacerbated by so-called just-in-time delivery and just-in-time manufacturing. Further, cargo theft, terrorism, smuggling (of drugs, arms and people) all will increase, creating an increased need for container and passenger examinations and inspections.

The basic tool today for monitoring cargo is the manifest. The cargo manifest is the basis of commercial agreements, e.g., assuring that what is shipped is what ultimately arrives at its destination. Cargo manifests are also the basis of monitoring hazardous cargo stowage, proper freight rate assessments and assessing customs duties.

Ports have always proved to be high-risk zones for any government to deter potential security threats. In today's security climate, the threat from arms, drugs, people, hazardous cargo and terrorism are among the biggest threats of penetration. Two additional economic security threats exist that are becoming of equal concern in ports. These threats are: container manifest fraud and cargo theft. Manifest fraud includes the introduction of illicit cargo after the manifest has been created or the omission from the manifest of already present cargo.

All security threats are ultimately ones of economic scale since any nation that cannot protect its citizens from terrorism, illegal drugs and illegal arms and which cannot assure enforcement of its custom laws or provide an environment conducive to commercial exchange cannot effectively compete in the world economy.

Cargo manifesting in a non-complex environment may be adequate, but in complex environments, it becomes increasingly inadequate and insecure.

SUMMARY OF THE INVENTION

This invention solves the above and other problems by providing methods, systems and devices for verification of the contents of containers, preferably large shipping containers.

Generally, a manifest declaring and detailing the contents of a cargo container is created. The manifest includes an image, preferably a backscatter X-ray image, of the contents of the container. The image is stored and, later, at an appropriate time and place, retrieved for comparison with a current image of the container's contents.

This approach allows for non-intrusive anomaly detection of contraband or of other inconsistencies between what was supposedly shipped in a cargo container and its present contents.

Accordingly, in one aspect, this invention is a method of verifying the contents of a cargo container. The method comprises acquiring an image of the cargo container and of the contents of the cargo container; and storing the image with a manifest associated with the cargo container. In some preferred embodiments, the image is a backscatter X-ray image of the cargo container. In some preferred embodiments, the image is a transmission X-ray image of the cargo container. In some embodiments, the manifest is sent to another location; and at the other location, a second image of the contents of the cargo container is acquired and compared with the image stored with the manifest associated with the cargo container. In some preferred embodiments, the second image is selectively acquired, based on a profile for the cargo container. The profile may be based on information derived from the manifest associated with the cargo container, e.g., on the cargo container's outbound port, shipping vessel, country of origin, and weight differences between the shipped cargo container and the arriving cargo container.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIG. 2B shows the logical structure of an entry in the Manifest Table of the manifest database according to an embodiment of this invention; and FIGS. 3A–3B are flow charts of the operation of an embodiment of this invention.

DETAILED DESCRIPTION OF THE PRESENTLY PREFERRED EXEMPLARY EMBODIMENTS

Structure of the System

Figure 1:
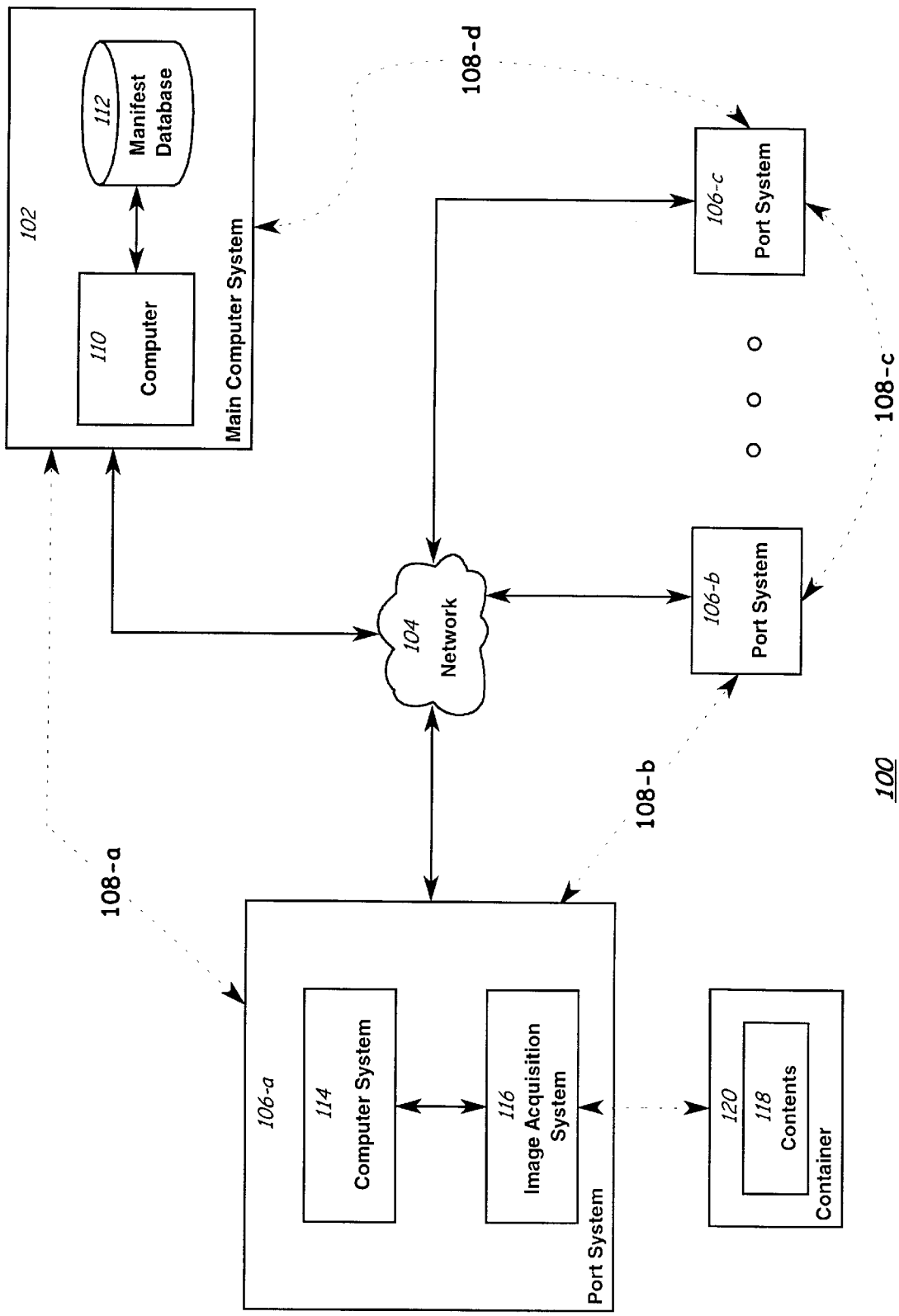
FIG. 1 shows an overview of the infrastructure of a container contents verification system according to an embodiment of this invention.

As shown in FIG. 1, a container contents verification system 100 according to an embodiment of this invention includes at least one main computer system 102 connectable directly or via a computer network 104 to each of a number of port systems 106-a, 106-b, 106-c, etc (hereinafter collectively "port systems 106"). The port systems 106 are also connectable to each other, either directly or via computer network 104. In order to keep the drawing simple, only some of the direct connections (108-a, 108-b, . . . ) between various ones of the main computer system 102 and the port systems 106 are shown (as dashed lines in FIG. 1). The direct connections 108-a, 108-b, . . . are collectively referred to as direct connections 108.

The network 104 may be the Internet or a dedicated network. Preferably all communication between the main computer system 102 and the port systems 106 is secure. The degree of security used is selected depending on the sensitivity and degree of security required by users of the system. Security can be achieved using conventional cryptographic techniques in combination with, if necessary, a dedicated network. In addition, for some information, the communication between two parties in the system 100 may be via a direct and secure mechanism. For example, two parties in the system 100 may exchange cryptographic keys via a direct and secure connection 108 and then interact via network 104 using those keys. A direct connection 108 between two parties may be in the form of a dedicated telephone line, or it may require the exchange of physical entities, e.g., smart cards, embodying the data to be exchanged.

The main computer system 102 includes a general purpose computer 110 connected to a manifest database 112. The computer 110 connects to the network 104 and the port systems 106 via some connection mechanism (not shown) such as a modem or the like.

Each port system 106 includes a computer system 114 and at least one image acquisition system 116 connectable to the computer system 114. The image acquisition system 116 is capable of obtaining images of the contents 118 of cargo containers 120 and of providing those images to the computer system 114. The image acquisition system 116 preferably provides digital images to the computer system 114, however, in some embodiments, the image acquisition system 116 provides analog images which the computer system 114 optionally digitizes.

As used in this description and in the appended claims, a "cargo container" is a receptacle for the storage or transportation of goods, and includes freight pallets as well as vehicles, whether motorized or drawn, such as automobiles, the cab and trailer of a truck, railroad cars or ship-borne containers. The term "cargo container," as used herein, further includes the structures and components of the receptacle.

In preferred embodiments of this invention, the image acquisition system 116 produces transmission and back scatter X-ray images of the contents 118 of cargo containers 120, however an image acquisition system which only produces one kind of X-ray images can also be used. If only one kind of X-ray images are produced, it is preferred that they be back scatter X-ray images.

Preferably, each port system 106 is geographically located at a port or harbor, and the containers 120 are shipping containers such as ISO/sea containers and/or air containers, however, any type and size of container is considered to be within the scope of this invention. The containers, e.g., may be cargo containers on the scale of motor vehicles or railroad cars.

In preferred embodiments of the present invention, the image acquisition system 116 is a CargoSearch™ or an ISOSearch™ or a MobileSearch™ X-ray inspection system manufactured by American Science and Engineering, Inc. ("AS&E") of Billerica, Mass. Systems such as the MobileSearch™ system are described in U.S. Pat. No. 5,764,683, titled, "Mobile X-ray inspection system for large objects," issued Jun. 9, 1998, the contents of which are incorporated herein by reference.

However, any image acquisition system capable of back-scatter X-ray images is acceptable as image acquisition system 116. In addition, image acquisition systems which produce other forms of images, e.g., X-ray images, can also be used, alone or in conjunction with back scatter X-ray images. A multi-X-ray (transmission X-ray and backscatter X-ray) approach offers a greater level of security than a single X-ray approach.

Conventional transmission X-ray images simply provide a map of the attenuation characteristics of the inspected object for the full spectrum of the X-ray beam. As used in this description and in the appended claims, the term "image" refers to any multidimensional representation, whether in tangible form or otherwise perceptible form or otherwise, whereby a value of some characteristic is associated with each of a plurality of locations corresponding to dimensional coordinates of an object in physical space, though not necessarily mapped one-to-one thereonto. Thus, for example, the graphic display of the spatial distribution of some feature, such as atomic number, in one or more colors constitutes an image. So, also, does an array of numbers in a computer memory or holographic medium. Similarly, "imaging" refers to the rendering of a stated physical characteristic in terms of one or more images.

Backscatter imaging in which the X-rays scattered by a material in a generally backward direction are employed offers several unique inspection capabilities and operational features:

(1) Taken alone, it is a one-sided imaging modality: images can be obtained even when the object is accessible from only one side, or, the object is too thick to be penetrated radiographically.

(2) Because the scatter signal falls off quite rapidly with increasing depth into the object, backscatter images effectively represent a "slice" of the object characteristic of the side nearest to the X-ray source; this image is frequently useful even when a transmission image representing the same scanned area is hopelessly confused by image clutter.

(3) The underlying physical phenomenon that leads to scattered radiation is the Compton effect. Low atomic number (low Z) materials, which encompass organic materials, interact with X-rays principally by Compton scattering. Narcotic drugs, being among the densest of organic materials, tend to produce the brightest signatures in a backscatter image, as do organic explosives, making backscatter imaging a useful imaging modality for bomb or drug detection.

(4) Alignment requirements of the X-ray beam with detectors or collimation devices are less exacting than for transmission imaging thereby enabling rapid deployment in a wide range of inspection scenarios.

In a preferred embodiment, the computer system 102 is a made up of Sun Sparc™ redundant mirrored servers running Microsoft Corporation's Windows NT operating system and hosting IBM compatible workstations. The computer system 102 preferably implements the manifest database 112 on a Microsoft Corporation SQL Server incorporating Data Integrated Imaging™.

The manifest database 112 includes eleven (11) tables, namely:

(1) Manifest Table 122
(2) Shipper Table 124
(3) Consignee Table 126
(4) Vessel Table 128
(5) Contents Table 130
(6) Container Table 132
(7) Image File Name Table 134
(8) International Ports Table 136
(9) Customs Table 138
(10) Port Control Table 140
(11) Validation Table 142
(12) Agent Table 144

Figure 2A:
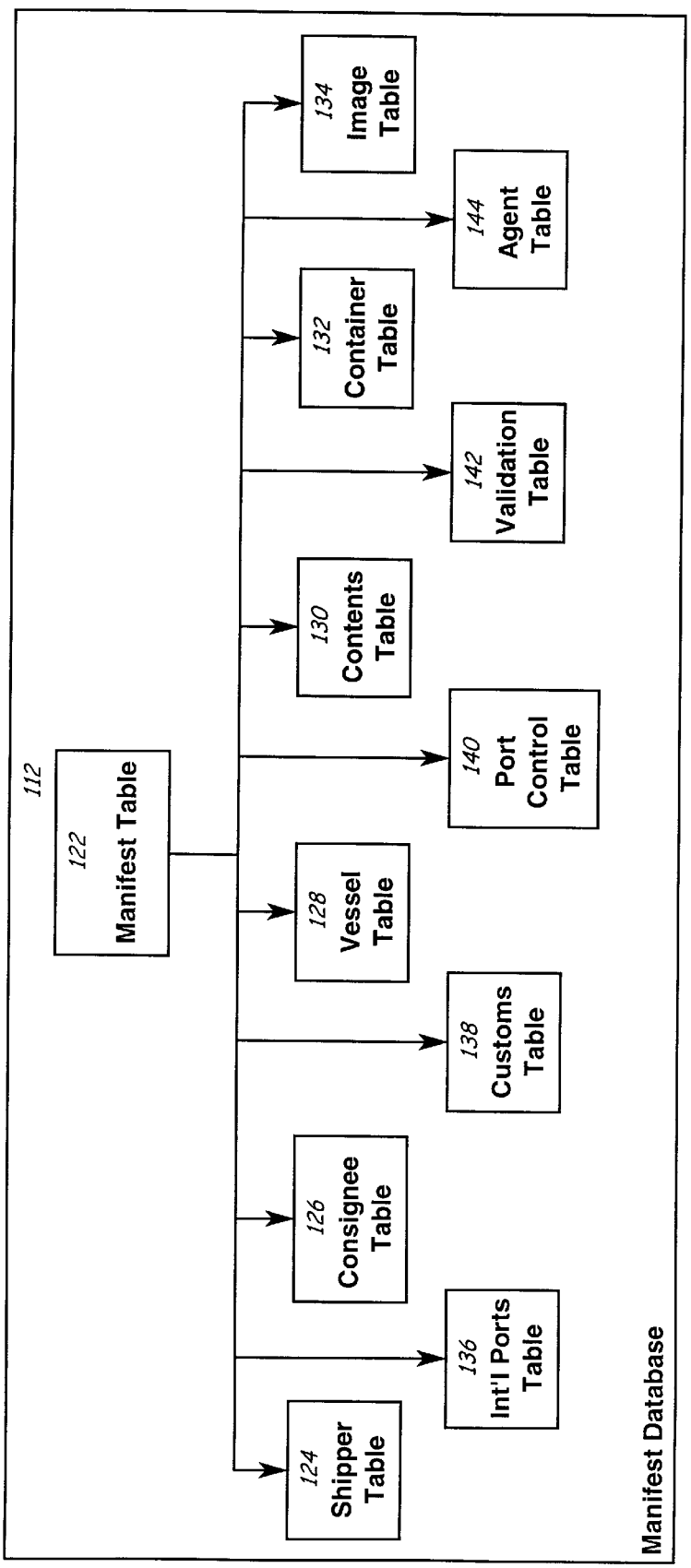
FIG. 2A shows the logical structure of the manifest database according to an embodiment of this invention.

Note that each cargo container (120 in FIG. 1) has a shipping manifest associated therewith. The information for shipping manifests is stored in the Manifest Database 112. The logical structure of the tables of the Manifest Database 112 is shown in FIG. 2A. Each record (see FIG. 2B) in the Manifest Table 122 includes the following fields:

(1) manifest identifier (ID);
(2) manifest date;
(3) operator identifier;
(4) container identifier (an entry in Container Table 132); and
(5) weight deviation.

Preferably the manifest date in a manifest database record is generated by a trusted device such that the date can be relied upon for security purposes. However, the date can be entered by a human operator. In general, all data in a manifest record is preferably entered by trusted devices, where possible. E.g., weights are entered by trusted scales, etc.

In addition, each entry in the Manifest Table 122 includes one or more pointers or entries from each of the other ten (10) tables. Thus, e.g., each Manifest Table record refers to a shipper (in Shipper Table 124) and to a shipping agent (in Agent Table 144). The entries in Shipper Table 124 and the Agent Table 144 contain company names, address and other needed contact information.

Each record in the Manifest Table 122 also refers to the contents of the container (in Contents Table 130). Each entry in the Contents Table 130 includes information about a containers contents, including:

quantity
description
unit value
extended value
unit weight
extended weight.

Note that a particular container may have various types of contents and therefore may require multiple entries in the Contents Table 130.

The Vessel Table 128 stores vessel information for each manifest, including:

vessel name
vessel flag
vessel IMO#

A Manifest Table entry also includes an outbound port and a destination port (both entries in the International Ports Table 136). The International Ports Table 136 stores information including dates of arrival, loading, departure and unloading of the container. Note that while the port data may be entered by an operator, it may also include data from a trusted device such as a GPS device which provides the exact location at which the container was sealed.

In some embodiments, each manifest table record also has a list (link) to related manifests. In this manner, if a cargo container is routed via various ports and shipped via various agents and vessels, this information will not be lost.

In addition to the above, each entry in the Manifest Table 122 also refers to an entry in the Image File Name Table 134. This entry corresponds to an image of the contents 118 of the cargo container 120 identified in the manifest table entry. The image is generated by the image acquisition system 116 which preferably produces a TIFF image.

Operation of the System

Figure 3B:
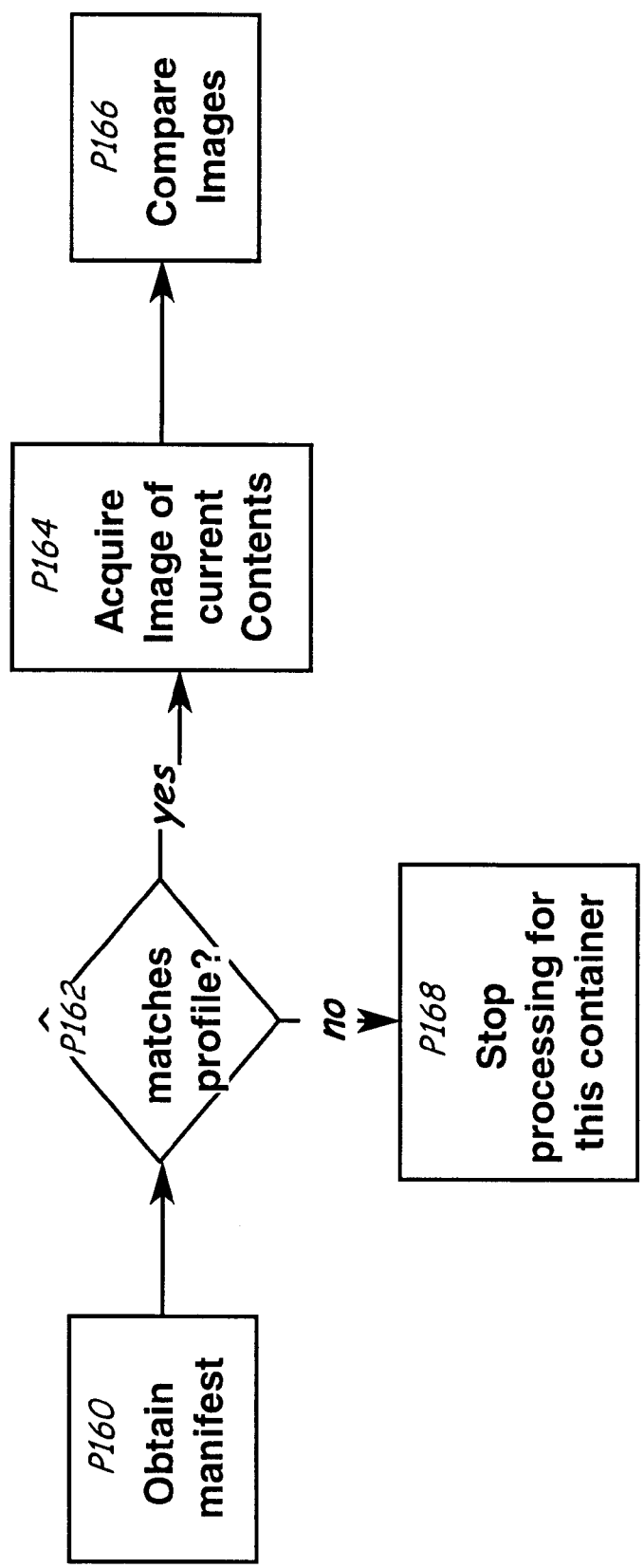

The container contents verification system 100 shown in FIGS. 1–2 operates as follows (with reference to the flow charts in FIGS. 3A–3B). At each departure port, the goal of the system is to produce a manifest record which will enable subsequent automatic inspection. Each cargo container 120 is assigned a unique identifier which is in some manner affixed to that container. (The manner of assigning and affixing the identifier to a container is not described for herein.) When a cargo container 120 is packed and passes through a port, a manifest is created for that cargo container 120. The manifest includes the information described above for the entries for the Manifest Table 122. Once the cargo container 120 has been sealed shut (at P146), the image acquisition system 116 at the port acquires an image of the contents 118 of the cargo container (at P148). This image of the contents is then associated with the container's manifest (at P150). At the time the image is acquired it may be directly displayed in graphic format for the visual inspection of human operators, but need not be so displayed. In particular, human operators may compare the image of the contents 118 to the stated contents in the manifest, but they need not do so.

Preferably the time of sealing of the container 120 and the time of obtaining the image of its contents are recorded in the database, as is the location (i.e., port location) at which the image was taken.

With the manifest for the container thus completed, the completed manifest (a record such as shown in FIG. 2B) is then sent to the main computer system 102 (at P154) which stores the manifest in the manifest database 112. As noted earlier, the manifest is preferably sent to the main computer system 102 by secure means, e.g., encryption. Further, to prevent tampering with or modification of manifests, they may be digitally signed (at P152) using known techniques, e.g., using public key cryptographic techniques. In this manner, upon receipt of each manifest, the main computer system 102 can verify the source of each manifest (at P156) before storing it in the manifest database 112 (at P158).

This encryption approach can be implemented as follows: Each port would have a public/private key pair, shared with each other port and with the main computer system. Whenever a port system 106 sends a manifest to the main computer system 102 (or to any other port system 106), it first digitally signs that manifest with its private key. The recipient can check the integrity of the manifest by checking its digital signature using the signer's public key, thereby verifying the source of the manifest. Inasmuch as the private key is kept secure, this provides an authenticated, non-repudiatable system.

When a cargo container 120 arrives in a port where its contents need to be checked, the port system 106 at that port obtains the manifest for that cargo container 120 from the main computer system 102 (or from the departure port) (at P160). Then, if the manifest indicates that the cargo container 120 warrants checking (as described below) at the arrival port (at P162), the image acquisition system 116 obtains an image of the current contents of the container 120 (at P164). The current image is then compared to the stored image (at P166) in order to determine whether or not the contents of the container have changed. The comparison of the two images can be done by a human operator or automatically, using computer software.

Using known, standardized packing methods, many items are always packed the same way. Accordingly, it is possible to create images depicting standardized packed containers of certain objects, e.g., fifteen refrigerators, five cares, etc. In some embodiments, standardized images are stored, based on known packing methods. These standardized images are then also used in the comparison (at P166). The standardized images can also be used at the time the manifest is created to detect anomalies.

Because of the very high number of cargo containers entering and leaving each port, the time required to check each and every arriving cargo container is prohibitive. According to a recent MARAD study, some 90,000 ships flying the flags of 200 nations move about 95 percent of global cargo. In the United States alone, some $900 billion in goods come in annually, making inspection of every container virtually impossible if any sort of efficient flow of commerce is to be sustained. For this reason, some methodology is needed to allow sampling of containers. In the preferred embodiment, profiles are used to select certain containers for checking (at P162). Such profiles may, for example, consider a container's outbound port, vessel, country of origin, weight differences between shipping and arriving, or any other information in the manifest, alone or in combination with other information in the manifest. If a manifest does not match a profile, thereby indicating that the corresponding cargo container need not be checked, processing of this container halts (at P168).

Profiles can be modified as necessary based on current results and external information. Also, profiles for particular types of contraband can be created with the help of local and international law enforcement.

Pre-Clearance Screening

As secure and efficient flow of cargo through ports and container facilities becomes more critical to the global economy, pre-clearance screening becomes more and more of a factor. Fast ships are being developed which can achieve trans-Atlantic crossings in less than half the time currently required. The success of such ships, particularly for transporting perishable cargo, depends on very short re-distribution and forwarding times. The present invention supports pre-clearance by forwarding a manifest (including an image of a container's contents) to the arrival port. At the arrival port the container can be re-imaged and the images compared for quick clearance by customs.

While described above for large cargo containers, this invention can be used for any size container, for motor vehicles, or for any other object that is shipped or shippable.

As described above, the manifest (including the image) is sent to the main computer system and/or to another port. The manifest may also be stored in electronic form on a computer-readable medium with the container. For example, the manifest may be stored in a RAM on a smartcard, on a computer disk or an any other device capable of storing digital information. In this manner, the manifest can be transported along with the container.

Thus, there are provided methods, systems and devices for container contents verification. One skilled in the art will appreciate that the present invention can be practiced by other than the described embodiments, which are presented for purposes of illustration and not limitation, and the present invention is limited only by the claims that follow.

What is claimed is:

1. A method of verifying the contents of a cargo container, the method comprising:

acquiring an image of the cargo container and of the contents of the cargo container;

storing the image with a manifest associated with the cargo container; and sending the manifest to an other location of the cargo container for verification of the contents of the cargo container using the image.

2. A method as in claim 1 wherein the acquiring of the image comprises acquiring a backscatter X-ray image of the cargo container.

3. A method as in claim 1 wherein the acquiring of the image comprises acquiring a transmission X-ray image of the cargo container.

4. A method as in claim 1 further comprising:

at the other location, acquiring a second image of the contents of the cargo container; and comparing the second image with the image stored with the manifest associated with the cargo container.

5. A method as in claim 4 further comprising, at the other location:

determining a profile for the cargo container; and selectively, based on the profile, acquiring and comparing the second image.

6. A method as in claim 5 wherein the profile is based on information derived from the manifest associated with the cargo container.

7. A method as in claim 6 wherein the profile is based on at least one of:

the cargo container's outbound port, the cargo container's shipping vessel, the cargo container's country of origin, and weight differences between the shipped cargo container and the arriving cargo container.

8. A method of verifying the contents of a cargo container, the method comprising:

at a first location:

(A1) acquiring at least one image of the cargo container and of the contents of the cargo container, the image being one of:

(a1) a backscatter X-ray image of the cargo container, and (a2) a transmission X-ray image of the cargo container;

(A2) storing the image with a manifest associated with the cargo container; and (A3) sending the manifest to another location; and at the other location, selectively:

(B1) acquiring a second image of the contents of the cargo container; and (B2) comparing the second image with the image stored with the manifest associated with the cargo container.

9. A method as in claim 8 further comprising:
determining a profile for the cargo container; and then
selectively, based on the profile, acquiring and comparing the second image.

10. A method as in claim 9 wherein the profile is based on information derived from the manifest associated with the cargo container.

11. A method as in claim 10 wherein the profile is based on at least one of:
the cargo container's outbound port,
the cargo container's shipping vessel,
the cargo container's country of origin, and
weight differences between the shipped cargo container and the arriving cargo container.

12. A system for verifying the contents of a cargo container, the system comprising:
means for acquiring an image of the cargo container and of the contents of the cargo container;
means for storing the image with a manifest associated with the cargo container; and
means for sending the manifest to an other location of the cargo container for verification of the contents of the cargo container using the image.

13. A system as in claim 12 wherein the means for acquiring of the image comprises means for acquiring a backscatter X-ray image of the cargo container.

14. A system as in claim 12 wherein the means for acquiring of the image comprises means for acquiring a transmission X-ray image of the cargo container.

15. A system as in claim 12 further comprising:
at the other location,
means for acquiring a second image of the contents of the cargo container; and
means for comparing the second image with the image stored with the manifest associated with the cargo container.

16. A system of verifying the contents of a cargo container, the system comprising:
at a first location:
(A1) means for acquiring at least one image of the cargo container and of the contents of the cargo container, the image being one of:
(a1) a backscatter X-ray image of the cargo container, and
(a2) a transmission X-ray image of the cargo container;
(A2) means for storing the image with a manifest associated with the cargo container; and
(A3) means for sending the manifest to another location; and
at the other location:
(B1) means for acquiring a second image of the contents of the cargo container; and
(B2) means for comparing the second image with the image stored with the manifest associated with the cargo container.

17. A system as in claim 16 further comprising:
means for determining a profile for the cargo container; and
means for selectively, based on the profile, acquiring and comparing the second image.

18. A system as in claim 17 wherein the profile is based on information derived from the manifest associated with the cargo container.

19. A system as in claim 18 wherein the profile is based on at least one of:
the cargo container's outbound port,
the cargo container's shipping vessel,
the cargo container's country of origin, and
weight differences between the shipped cargo container and the arriving cargo container.

20. A computer program product including computer program code to cause a processor to perform a method of verifying the contents of a cargo container, the method comprising:
acquiring an image of the cargo container and of the contents of the cargo container;
storing the image with a manifest associated with the cargo container; and
sending the manifest to an other location of the cargo container for verification of the contents of the cargo container using the image.

21. A computer program product as in claim 20 wherein the acquiring of the image comprises acquiring a backscatter X-ray image of the cargo container.

22. A computer program product as in claim 20 wherein the acquiring of the image comprises acquiring a transmission X-ray image of the cargo container.

23. A computer program product as in claim 20, the method further comprising:
at the other location,
acquiring a second image of the contents of the cargo container; and
comparing the second image with the image stored with the manifest associated with the cargo container.

24. A computer program product as in claim 23, the method further comprising, at the other location:
determining a profile for the cargo container; and
selectively, based on the profile, acquiring and comparing the second image.

25. A computer program product as in claim 24 wherein the profile is based on information derived from the manifest associated with the cargo container.

26. A computer program product as in claim 25 wherein the profile is based on at least one of:
the cargo container's outbound port,
the cargo container's shipping vessel,
the cargo container's country of origin, and
weight differences between the shipped cargo container and the arriving cargo container.

27. A computer program product including computer program code to cause a processor to perform a method of verifying the contents of a cargo container, the method comprising:
at a first location:
(A1) acquiring at least one image of the cargo container and of the contents of the cargo container, the image being one of:
(a1) a backscatter X-ray image of the cargo container, and
(a2) a transmission X-ray image of the cargo container;
(A2) storing the image with a manifest associated with the cargo container; and
(A3) sending the manifest to another location; and
at the other location, selectively:
(B1) acquiring a second image of the contents of the cargo container; and
(B2) comparing the second image with the image stored with the manifest associated with the cargo container.

28. A computer program product as in claim 27, the method further comprising:
   determining a profile for the cargo container; and then
   selectively, based on the profile, acquiring and comparing the second image.

29. A computer program product as in claim 28 wherein the profile is based on information derived from the manifest associated with the cargo container.

30. A computer program product as in claim 29 wherein the profile is based on at least one of:
   the cargo container's outbound port,
   the cargo container's shipping vessel,
   the cargo container's country of origin, and
   weight differences between the shipped cargo container and the arriving cargo container.

31. A method of verifying the contents of a cargo container, the method comprising:
   acquiring an image of the cargo container and of the contents of the cargo container;
   receiving a manifest associated with the cargo container; and
   comparing the image of the cargo container with an other image stored with the manifest associated with the cargo container.

32. A method as in claim 31 wherein the acquiring of the image comprises acquiring a backscatter X-ray image of the cargo container.

33. A method as in claim 31 wherein the acquiring of the image comprises acquiring a transmission X-ray image of the cargo container.

34. A method as in claim 31 further comprising determining a profile for the cargo container; and
   wherein acquiring and comparing the image of the cargo container is performed selectively based on the profile.

35. A method as in claim 34 wherein the profile is based on information derived from the manifest associated with the cargo container.

36. A method as in claim 35 wherein the profile is based on at least one of:
   the cargo container's outbound port,
   the cargo container's shipping vessel,
   the cargo container's country of origin, and
   weight differences between the shipped cargo container and the arriving cargo container.

37. A system of verifying the contents of a cargo container, the method comprising:
   means for acquiring an image of the cargo container and of the contents of the cargo container;
   means for receiving a manifest associated with the cargo container; and
   means for comparing the image of the cargo container with another image stored with the manifest associated with the cargo container.

38. A system as in claim 37 wherein the means for acquiring of the image comprises means for acquiring a backscatter X-ray image of the cargo container.

39. A system as in claim 37 wherein the means for acquiring of the image comprises means for acquiring a transmission X-ray image of the cargo container.

40. A system as in claim 37 further comprising means for determining a profile for the cargo container; and
   wherein the means for acquiring and comparing the image of the cargo container operates selectively based on the profile.

41. A system as in claim 40 wherein the profile is based on information derived from the manifest associated with the cargo container.

42. A system as in claim 41 wherein the profile is based on at least one of:
   the cargo container's outbound port,
   the cargo container's shipping vessel,
   the cargo container's country of origin, and
   weight differences between the shipped cargo container and the arriving cargo container.

43. A computer program product including computer program code to cause a processor to perform a method of verifying the contents of a cargo container, the method comprising:
   acquiring an image of the cargo container and of the contents of the cargo container;
   receiving a manifest associated with the cargo container; and
   comparing the image of the cargo container with another image stored with the manifest associated with the cargo container.

44. A computer program product as in claim 43 wherein the acquiring of the image comprises acquiring a backscatter X-ray image of the cargo container.

45. A computer program product as in claim 43 wherein the acquiring of the image comprises acquiring a transmission X-ray image of the cargo container.

46. A computer program product as in claim 43, the method further comprising determining a profile for the cargo container; and
   wherein acquiring and comparing the image of the cargo container is performed selectively based on the profile.

47. A computer program product as in claim 46 wherein the profile is based on information derived from the manifest associated with the cargo container.

48. A computer program product as in claim 47 wherein the profile is based on at least one of:
   the cargo container's outbound port,
   the cargo container's shipping vessel,
   the cargo container's country of origin, and
   weight differences between the shipped cargo container and the arriving cargo container.

* * * * *